(12) United States Patent
Jia et al.

(10) Patent No.: US 8,363,583 B2
(45) Date of Patent: Jan. 29, 2013

(54) CHANNEL ACCESS SCHEME FOR ULTRA-WIDE BAND COMMUNICATION

(75) Inventors: Zhanfeng Jia, Belmont, CA (US); Amal Ekbal, San Diego, CA (US); David Jonathan Julian, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1007 days.

(21) Appl. No.: 11/611,338

(22) Filed: Dec. 15, 2006

(65) Prior Publication Data

US 2008/0144560 A1 Jun. 19, 2008

(51) Int. Cl.
*H04H 20/71* (2008.01)
*H04J 9/00* (2006.01)
*H04J 3/16* (2006.01)

(52) U.S. Cl. ........................................ 370/312; 370/465
(58) Field of Classification Search .................. None
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |

(Continued)

FOREIGN PATENT DOCUMENTS

| | | |
|---|---|---|
| CN | 1833410 A | 9/2006 |
| EP | 1303056 | 4/2003 |
| JP | 2003258812 A | 9/2003 |
| JP | 2005253047 A | 9/2005 |
| WO | 2005018159 | 2/2005 |

OTHER PUBLICATIONS

International Search Report—PCT/US07/087574—International Search Authority, European Patent Office, Jun. 6, 2008.

(Continued)

*Primary Examiner* — Chirag Shah
*Assistant Examiner* — Srinivasa Reddivalam
(74) *Attorney, Agent, or Firm* — Dang M. Vo; Paul S. Holdaway

(57) ABSTRACT

A channel access scheme is provided for a pulse-based ultra-wide band network. Here, concurrent ultra-wide band channels may be established through the use of a pulse division multiple access scheme. An access scheme may employ different states each of which may be associated with different channel parameter state information and/or different duty cycles. For example, a channel access scheme may employ an inactive state, an idle state, a connected state, and a streaming state. Multiple logical channels may be defined for a given ultra-wide band channel via, for example, pulse division multiplexing.

66 Claims, 9 Drawing Sheets

U.S. PATENT DOCUMENTS

| | | | |
|---|---|---|---|
| 6,304,623 | B1 | 10/2001 | Richards et al. |
| 6,351,652 | B1 | 2/2002 | Finn et al. |
| 6,354,946 | B1 | 3/2002 | Finn |
| 6,400,307 | B2 | 6/2002 | Fullerton et al. |
| 6,400,329 | B1 | 6/2002 | Barnes |
| 6,421,389 | B1 | 7/2002 | Jett et al. |
| 6,430,208 | B1 | 8/2002 | Fullerton et al. |
| 6,437,756 | B1 | 8/2002 | Schantz |
| 6,462,701 | B1 | 10/2002 | Finn |
| 6,466,125 | B1 | 10/2002 | Richards et al. |
| 6,469,628 | B1 | 10/2002 | Richards et al. |
| 6,483,461 | B1 | 11/2002 | Matheney et al. |
| 6,489,893 | B1 | 12/2002 | Richards et al. |
| 6,492,904 | B2 | 12/2002 | Richards |
| 6,492,906 | B1 | 12/2002 | Richards et al. |
| 6,501,393 | B1 | 12/2002 | Richards et al. |
| 6,504,483 | B1 | 1/2003 | Richards et al. |
| 6,512,455 | B2 | 1/2003 | Finn et al. |
| 6,512,488 | B2 | 1/2003 | Schantz |
| 6,519,464 | B1 | 2/2003 | Santhoff et al. |
| 6,529,568 | B1 | 3/2003 | Richards et al. |
| 6,538,615 | B1 | 3/2003 | Schantz |
| 6,539,213 | B1 | 3/2003 | Richards et al. |
| 6,549,567 | B1 | 4/2003 | Fullerton |
| 6,552,677 | B2 | 4/2003 | Barnes et al. |
| 6,556,621 | B1 | 4/2003 | Richards et al. |
| 6,560,463 | B1 | 5/2003 | Santhoff |
| 6,571,089 | B1 | 5/2003 | Richards et al. |
| 6,573,857 | B2 | 6/2003 | Fullerton et al. |
| 6,577,691 | B2 | 6/2003 | Richards et al. |
| 6,585,597 | B2 | 7/2003 | Finn |
| 6,593,886 | B2 | 7/2003 | Schantz |
| 6,606,051 | B1 | 8/2003 | Fullerton et al. |
| 6,611,234 | B2 | 8/2003 | Fullerton et al. |
| 6,614,384 | B2 | 9/2003 | Hall et al. |
| 6,621,462 | B2 | 9/2003 | Barnes |
| 6,636,566 | B1 | 10/2003 | Roberts et al. |
| 6,636,567 | B1 | 10/2003 | Roberts et al. |
| 6,636,573 | B2 | 10/2003 | Richards et al. |
| 6,642,903 | B2 | 11/2003 | Schantz |
| 6,661,342 | B2 | 12/2003 | Hall et al. |
| 6,667,724 | B2 | 12/2003 | Barnes et al. |
| 6,670,909 | B2 | 12/2003 | Kim |
| 6,671,310 | B1 | 12/2003 | Richards et al. |
| 6,674,396 | B2 | 1/2004 | Richards et al. |
| 6,677,796 | B2 | 1/2004 | Brethour et al. |
| 6,700,538 | B1 | 3/2004 | Richards |
| 6,710,736 | B2 | 3/2004 | Fullerton et al. |
| 6,717,992 | B2 | 4/2004 | Cowie et al. |
| 6,748,040 | B1 | 6/2004 | Johnson et al. |
| 6,750,757 | B1 | 6/2004 | Gabig, Jr. et al. |
| 6,759,948 | B2 | 7/2004 | Grisham et al. |
| 6,760,387 | B2 | 7/2004 | Langford et al. |
| 6,762,712 | B2 | 7/2004 | Kim |
| 6,763,057 | B1 | 7/2004 | Fullerton et al. |
| 6,763,282 | B2 | 7/2004 | Glenn et al. |
| 6,774,846 | B2 | 8/2004 | Fullerton et al. |
| 6,774,859 | B2 | 8/2004 | Schantz et al. |
| 6,778,603 | B1 | 8/2004 | Fullerton et al. |
| 6,781,530 | B2 | 8/2004 | Moore |
| 6,782,048 | B2 | 8/2004 | Santhoff |
| 6,788,730 | B1 | 9/2004 | Richards et al. |
| 6,810,087 | B2 * | 10/2004 | Hoctor et al. ............... 375/259 |
| 6,822,604 | B2 | 11/2004 | Hall et al. |
| 6,823,022 | B1 | 11/2004 | Fullerton et al. |
| 6,836,223 | B2 | 12/2004 | Moore |
| 6,836,226 | B2 | 12/2004 | Moore |
| 6,845,253 | B1 | 1/2005 | Schantz |
| 6,847,675 | B2 | 1/2005 | Fullerton et al. |
| 6,879,878 | B2 | 4/2005 | Glenn et al. |
| 6,882,301 | B2 | 4/2005 | Fullerton |
| 6,895,034 | B2 | 5/2005 | Nunally et al. |
| 6,900,732 | B2 | 5/2005 | Richards |
| 6,906,625 | B1 | 6/2005 | Taylor et al. |
| 6,907,244 | B2 | 6/2005 | Santhoff et al. |
| 6,912,240 | B2 | 6/2005 | Kumar et al. |
| 6,914,949 | B2 | 7/2005 | Richards et al. |
| 6,917,284 | B2 | 7/2005 | Grisham et al. |
| 6,919,838 | B2 | 7/2005 | Santhoff |
| 6,922,166 | B2 | 7/2005 | Richards et al. |
| 6,922,177 | B2 | 7/2005 | Barnes et al. |
| 6,925,109 | B2 | 8/2005 | Richards et al. |
| 6,933,882 | B2 | 8/2005 | Fullerton |
| 6,937,639 | B2 | 8/2005 | Pendergrass et al. |
| 6,937,663 | B2 | 8/2005 | Jett et al. |
| 6,937,667 | B1 | 8/2005 | Fullerton et al. |
| 6,937,674 | B2 | 8/2005 | Santhoff et al. |
| 6,947,492 | B2 | 9/2005 | Santhoff et al. |
| 6,950,485 | B2 | 9/2005 | Richards et al. |
| 6,954,480 | B2 | 10/2005 | Richards et al. |
| 6,959,031 | B2 | 10/2005 | Haynes et al. |
| 6,959,032 | B1 | 10/2005 | Richards et al. |
| 6,963,727 | B2 | 11/2005 | Shreve |
| 6,980,613 | B2 | 12/2005 | Krivokapic |
| 6,989,751 | B2 | 1/2006 | Richards |
| 7,015,793 | B2 | 3/2006 | Gabig, Jr. et al. |
| 7,020,224 | B2 | 3/2006 | Krivokapic |
| 7,027,425 | B1 | 4/2006 | Fullerton et al. |
| 7,027,483 | B2 | 4/2006 | Santhoff et al. |
| 7,027,493 | B2 | 4/2006 | Richards |
| 7,030,806 | B2 | 4/2006 | Fullerton |
| 7,042,417 | B2 | 5/2006 | Santhoff et al. |
| 7,046,187 | B2 | 5/2006 | Fullerton et al. |
| 7,046,618 | B2 | 5/2006 | Santhoff et al. |
| 7,069,111 | B2 | 6/2006 | Glenn et al. |
| 7,075,476 | B2 | 7/2006 | Kim |
| 7,079,827 | B2 | 7/2006 | Richards et al. |
| 7,099,367 | B2 | 8/2006 | Richards et al. |
| 7,099,368 | B2 | 8/2006 | Santhoff et al. |
| 7,129,886 | B2 | 10/2006 | Hall et al. |
| 7,132,975 | B2 | 11/2006 | Fullerton et al. |
| 7,145,954 | B1 | 12/2006 | Pendergrass et al. |
| 7,148,791 | B2 | 12/2006 | Grisham et al. |
| 7,151,490 | B2 | 12/2006 | Richards |
| 7,167,525 | B2 | 1/2007 | Santhoff et al. |
| 7,170,408 | B2 | 1/2007 | Taylor et al. |
| 7,184,938 | B1 | 2/2007 | Lansford et al. |
| 7,190,722 | B2 | 3/2007 | Lakkis et al. |
| 7,190,729 | B2 | 3/2007 | Siwiak |
| 7,206,334 | B2 | 4/2007 | Siwiak |
| 7,209,724 | B2 | 4/2007 | Richards et al. |
| 7,230,980 | B2 | 6/2007 | Langford et al. |
| 7,239,277 | B2 | 7/2007 | Fullerton et al. |
| RE39,759 | E | 8/2007 | Fullerton |
| 7,256,727 | B2 | 8/2007 | Fullerton et al. |
| 7,271,779 | B2 | 9/2007 | Hertel |
| 7,436,850 | B2 * | 10/2008 | Mowery et al. ............... 370/466 |
| 2002/0190786 | A1 * | 12/2002 | Yoon et al. .................... 329/313 |
| 2005/0210157 | A1 * | 9/2005 | Sakoda .......................... 709/251 |
| 2005/0237921 | A1 * | 10/2005 | Showmake .................. 370/208 |
| 2007/0025739 | A1 * | 2/2007 | Moore et al. .................. 398/202 |
| 2008/0165746 | A1 * | 7/2008 | Sung et al. .................... 370/337 |

OTHER PUBLICATIONS

International Search Report—PCT/US07/087574—International Search Authority, European Patent Office—Oct. 13, 2008.

Written Opinion—PCT/US071087574—International Search Authority, European Patent Office—Oct. 13, 2008.

El Fawal A., et al., "Trade-off analysis of PHY-Aware MAC in low-rate low-power UWB networks", Communications Magazine, IEEE, Dec. 2005, vol. 43, No. 12, pp. 147-155, URL, http://ieeexplore.ieee.org/stamp/stamp.jsp"tp=&arnumber=1561932.

Segawa S., et al., "Multiuser Detection for Ultra Wideband Wireless (UWB)," Technical Report of The Institute of Electronics, Information and Communication Engineers, Japan, Mar. 11, 2002, vol. 101, No. 727, pp. 95-100, ISEC 2001-106, URL http://ci.nii.ac.jp/naid/110003298168/.

Takiishi K., et al., "Power Consumption Reduction by Random Access and Intermittent Reception with Time Hopping," Transactions of the Society Conference of The Institute of Electronics, Information and Communication Engineers, Japan, Sep. 7, 2005, 2005 Communications (1), p. 501, URL http://ci.nii.ac.jp/naid/110004739020/.

* cited by examiner

CHANNEL ACCESS SCHEME FOR ULTRA-WIDE BAND COMMUNICATION

BACKGROUND

1. Field

This application relates generally to communications, and to an access scheme for ultra-wide band communication.

2. Background

In a wireless communication system multiple wireless devices may communicate with one another via signals having frequencies within a given radio frequency band. Here, provisions may be made to prevent transmissions from one device from interfering with transmissions from another device. For example, some systems employ media access control that allows only one device to use a given medium (e.g., a radio frequency band) at a time. One way of accomplishing this is to require that each device check the medium to determine whether another device is currently transmitting over the medium. If the medium is in use, the device will delay transmitting until a later time when the medium is not in use. Alternatively, some systems use a signaling technique such as spread spectrum that modifies transmitted signals to reduce the likelihood of transmissions from one device interfering with simultaneous transmissions of another device within the same frequency band.

Techniques such as these may be employed in a variety of wireless communication systems. An example of such a wireless communication system is an ultra-wide band system. Ultra-wide band technology may be used, for example, in personal area network ("PAN") or body area network ("BAN") applications.

At least one access scheme has been proposed for use in ultra-wide band systems. For example, IEEE 802.15.4a proposes a channel access scheme for achieving a low duty cycle in an ultra-wide band-based wireless PAN. This proposal specifies the use of a superframe structure that is defined by a central personal area network coordinator. The superframe structure begins with a beacon and contains a slotted contention access period ("CAP") and a slotted contention free period ("CFP"). For the CAP, it is assumed that a random channel access scheme such as ALOHA or carrier sense multiple access ("CSMA") is employed. The PAN coordinator assigns the CFP slots. A data frame in every slot starts with a preamble sequence for the receiver to achieve channel acquisition. An additional inactive portion of superframe may further reduce the duty cycle.

An access scheme in a wireless PAN or BAN may need to support a variety of applications including, for example, audio streaming, voice calls, file transfers, and sensor data transfers. However, these applications may have significantly different requirements in terms of one or more of data rate, latency, burstiness, and error tolerance. Consequently, an access scheme preferably provides sufficient flexibility to handle different data rates simultaneously and maintain different levels of duty cycle for these applications and/or other applications.

SUMMARY

A summary of selected aspects of the disclosure follows. For convenience, these and other aspects of the disclosure may be referred to herein simply as "an aspect" or "aspects."

In some aspects a channel access scheme is provided for an ultra-wide band network. Here, signaling for a given channel in the network may employ ultra-wide band pulses. For example, the pulses for a given channel may be of relatively short duration and generated at a relatively low duty cycle.

In some aspects concurrent ultra-wide band channels are established through the use of a pulse division multiple access scheme. For example, orthogonal or pseudo orthogonal channels may be defined by controlling the timing or sequencing of pulses of the channels. In some aspects a channel may be defined in terms of one or more parameters such as a pulse repetition frequency, a pulse offset, a time hopping sequence, or a spreading pseudorandom noise sequence parameter. In addition, one or more of these parameters may be derived based on one or more unique parameters relating to the channel such as an address of a device that establishes the channel, a channel number, a sequence number, or a security key.

In some aspects a channel access scheme employs different states, each of which may be associated with different channel parameter state information and/or different duty cycles. For example, in some states a given device may maintain information relating to a given channel (e.g., a device address of another device that uses the channel), while in other states the device may maintain more or less channel-related information. In addition, in some states data may be transmitted and received more frequently than in other states. Such a state-based channel access scheme may advantageously provide a desired tradeoff between low power consumption and an ability to support various types of data and data rates.

In some aspects a state-based channel access scheme employs an inactive state, an idle state, a connected state, and a streaming state. For example, the inactive state may comprise a state where a receiver is not maintaining channel parameter information for a given channel or is not scanning for activity on the channel. Thus, this state may be associated with a very low duty cycle. The idle state may comprise a state where a receiver maintains some channel parameter information and periodically scans the channel. Thus, this state may be associated with a low duty cycle. The connected state may comprise a state where a receiver expects to receive data over a channel. Consequently, in this state the receiver may regularly or continuously scan the channel for data. In some aspects the connected state may be designated for the transfer of relatively bursty data such as packet-based data. The streaming state may comprise a state where data is regularly or continuously sent over the channel. In some aspects the streaming state may be designated for the transfer of relatively continuous data such as audio, video or other streaming data. Advantageously, through the use of such a state-based mechanism, the channel access scheme may enable a device to effectively transition between the states to provide a desired tradeoff between supporting a desired type of data transfer and maintaining a low duty cycle when no or relatively little traffic is to be sent over the channel.

In some aspects multiple logical channels may be defined for a given ultra-wide band channel. In this way, a given channel may provide different channels that support different types of data and/or different data rates. In some aspects pulse division multiplexing may be employed to provide multiple logical channels.

BRIEF DESCRIPTION OF THE DRAWINGS

These and other features, aspects and advantages of the disclosure will be more fully understood when considered with respect to the following detailed description, appended claims and accompanying drawings, wherein:

FIG. 2, including

Figure 1:
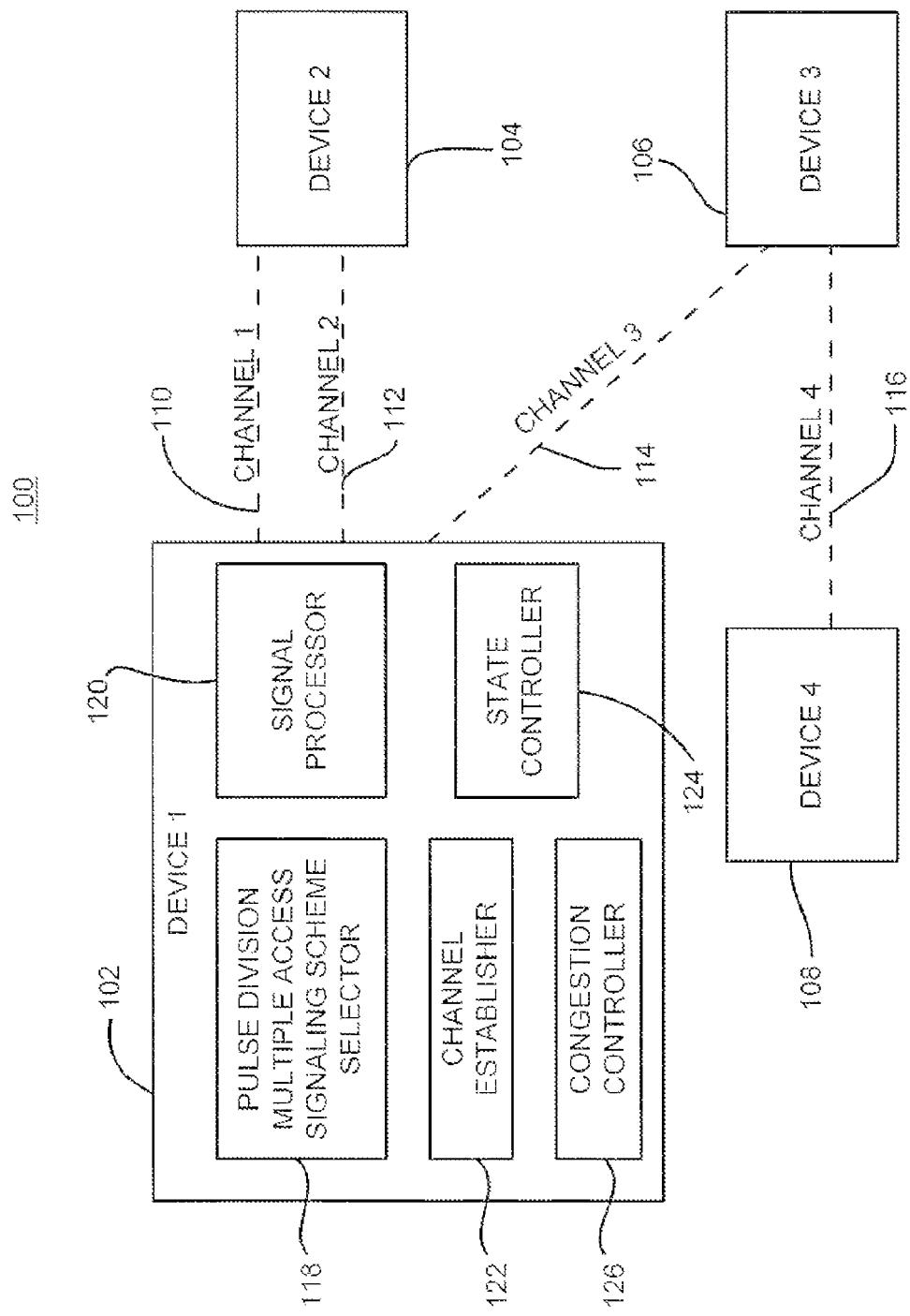
FIG. 1 is a simplified block diagram of several sample aspects of a communication system adapted to provide concurrent ultra-wide band channels.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein.

A channel access scheme enables two or more devices to communicate over a common communication medium. For example, a spectrum of an ultra-wide band-based wireless PAN or BAN may be divided into channels in time-space. These channels may be defined, for example, to accommodate different types of data, different data rates, different qualities of service, or some other criteria. In such a channelization scheme, various techniques may be employed to set up the channels and make use of the channels.

FIG. 1 illustrates certain aspects of a system 100 where several wireless communication devices 102, 104, 106, and 108 are adapted to establish wireless communication channels 110, 112, 114, and 116 with one another. To reduce the complexity of FIG. 1 selected aspects of the devices are only illustrated in conjunction with the device 102. It should be appreciated, however, that the devices 104, 106, and 108 may incorporate similar functionality.

In the example of FIG. 1, the devices 102, 104, 106, and 108 communicate via a pulsed-based physical layer. In some aspects the physical layer may utilize ultra-wide band pulses that have a relatively short length (e.g., on the order of a few nanoseconds) and a relatively wide bandwidth. In some aspects an ultra-wide band system may be defined as a system having a fractional bandwidth on the order of approximately 20% or more and/or having a bandwidth greater on the order of approximately 500 MHz or more.

The device 102 illustrates several components that may be used to define, establish, and communicate over one or more ultra-wideband channels. For example, a pulse division multiple access ("PDMA") signaling scheme selector 118 may be used to define and/or select different signaling parameters for different channels. In a PDMA scheme, the timing of pulses (e.g., the pulse positions in time-space) for the channels may be used to differentiate one channel from another. Here, through the use of relatively narrow pulses (e.g., pulse widths on the order of a few nanoseconds) and relatively low duty cycles (e.g., pulse repetition periods on the order of hundreds of nanoseconds or microseconds), there may be sufficient room to interlace pulses for one or more other channels between the pulses for a given channel. FIG. 2 illustrates several examples of signaling parameters that may be employed in a PDMA scheme. For illustration purposes, the signaling of FIG. 2 is depicted as having a duty cycle on the order of 10%. It should be appreciated, however, that much lower duty cycles may be employed in practice (e.g., as discussed above).

Figure 2A:
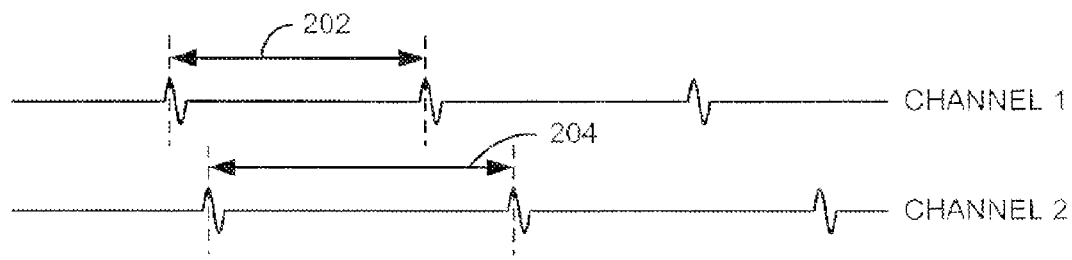
FIGS. 2A, 2B, and 2C, depicts several simplified examples of pulse signaling.

FIG. 2A illustrates different channels (channels 1 and 2) defined with different pulse repetition frequencies. Specifically, pulses for channel 1 have a pulse repetition frequency corresponding to a pulse-to-pulse delay period 202. Conversely, pulses for channel 2 have a pulse repetition frequency corresponding to a pulse-to-pulse delay period 204. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies, substantially all pulses for a given channel may be transmitted at different times than pulses for any other channel.

Figure 2B:
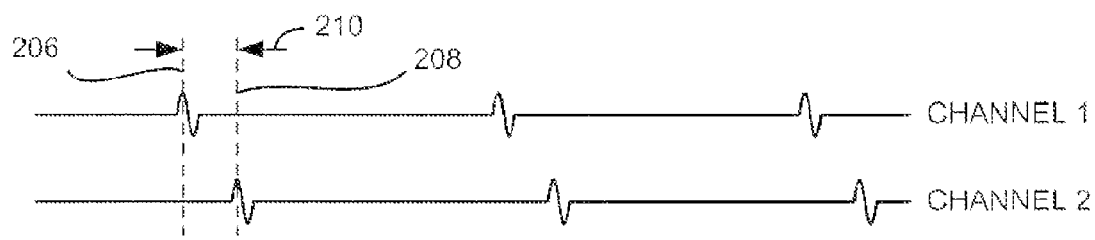

FIG. 2B illustrates different channels (channels 1 and 2) defined with different pulse offsets. Pulses for channel 1 are generated at a point in time as represented by line 206 in accordance with a first pulse offset (e.g., with respect to a given point in time, not shown). Conversely, pulses for channel 2 are generated at a point in time as represented by line 208 in accordance with a second pulse offset. Given the pulse offset difference between the pulses (as represented by the arrows 210), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 2C:
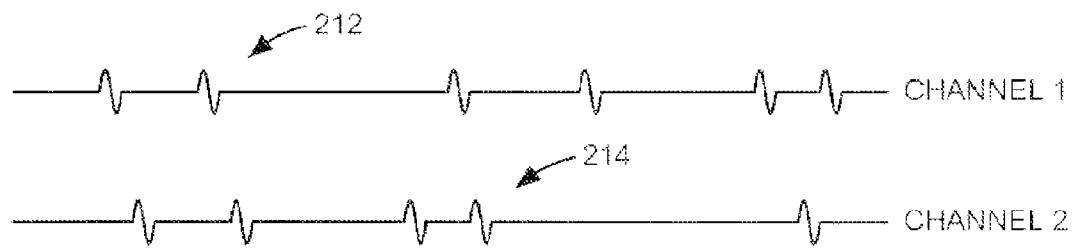

FIG. 2C illustrates different channels (channels 1 and 2) defined with different timing hopping sequences. For example, pulses 212 for channel 1 may be generated at times in accordance with one time hopping sequence while pulses 214 for channel 2 may be generated at times in accordance with another time hopping sequence. Depending on the specific sequences used and the precision of the timing between the devices, this technique may be used to provide orthogonal or pseudo-orthogonal channels.

It should be appreciated that other techniques may be used to define channels in accordance with a PDMA scheme. For example, a channel may be defined based on different spreading pseudo-random number sequences, different preamble sequence or some other suitable parameter or parameters. Moreover, a channel may be defined based on a combination of two or more parameters.

Referring again to FIG. 1, a signal processor 120 processes signals to be transmitted over a channel and/or processes signals received from a channel in accordance with the signaling scheme. For example, the signal processor 118 may generate data pulses to be transmitted over the channel and/or extract data from pulses received via the channel.

The device 102 also includes a component 122 that establishes one or more channels in accordance with one or more signaling schemes. The device 102 may establish a channel independently or in cooperation with one or more of the other devices 104, 106, and 108 in the system 100.

In some aspects the device 102 may independently establish a channel without coordinating with respect to an access scheme (e.g., media access control) for any other channel. For example, the device 102 may establish a channel without knowledge of (e.g., without determining) the signaling parameters of other channels that are operating nearby. This may be accomplished, for example, through the use of signaling scheme selection techniques that define pulse parameters such that the resulting channels generate pseudo-orthogonal pulses. That is, a given channel may generate pulses such that there is a low probability of the pulses interfering with (e.g., occurring at the same time as) pulses for another channel.

Alternatively, the device 102 may cooperate with one or more other devices to determine the signaling parameters of other channels that are operating nearby. Based on this information, the device 102 may then select one or more unique parameters for any channel it is establishing. A channel may thus be defined in such as way as to reduce or eliminate interference with other channels.

When establishing a channel, the device 102 (e.g., component 122) will communicate with another device or other devices that will use a given channel so that each device will learn the signaling parameters used to communicate over the channel. For example, the devices may negotiate to use particular parameters and/or the parameters may be selected based on one or more characteristics of the devices (e.g., a device address).

Advantageously, one or more devices may establish one or more channels without the use of a central coordinator. As discussed above, a device may independently define a channel. Here, through the use of an appropriate PDMA scheme as taught herein, the resulting channel may not significantly interfere with other independently established channels. For example, each device may define the channel parameters randomly, based on parameters that may be unique to the device or devices establishing the channel (e.g., device addresses), or based on parameters selected by the device or devices. Accordingly, a pure peer-to-peer network (or subnetwork) may be established through the use of such devices. That is, the devices that establish the channels in the network may be peer devices. For example, the devices may have substantially equivalent media access control ("MAC") functionality. Advantageously, in some aspects no coordination may be required between different peer-to-peer channels to establish and use such channels.

Figure 3:
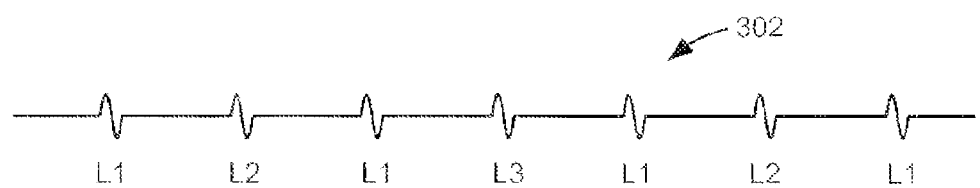
FIG. 3 is a simplified diagram illustrating an example of a logical channel scheme.

The device 102 (e.g., component 122) also may define several logical channels within a given channel. These channels may be defined, for example, to accommodate different types of data, different data rates, different qualities of service, or some other criteria. In some aspects pulse division multiplexing may be employed to provide multiple logical channels within a given channel. For example, FIG. 3 depicts a simplified example where pulses 302 transmitted in a channel are associated with a first logical channel (L1), a second logical channel (L2), or a third logical channel (L3).

The device 102 (e.g., component 122) also may define a timeslot structure for a channel. For example, a series of timeslots may be defined such that various data transmissions for a channel are timed to occur within designated timeslots. In this case, some form of synchronization may be employed to ensure the each device communicating via the channel maintains the timing of the timeslot structure.

A timeslot structure may be used for various purposes. For example, various logical channels may be assigned to various timeslots. Also, a pulse repetition frequency may be defined based on a timeslot structure. Moreover, a streaming channel may be established through the use of a timeslot structure.

In some implementations the device 102 may incorporate a component 126 to control or otherwise account for congestion in the wireless medium. For example, a congestion controller 126 may implement a request-to-synchronize ("RTS") and confirmation-to-synchronize ("CTS") scheme, ALOHA, CSMA, or some other suitable congestion management scheme.

Advantageously, through the use of multiple access techniques as taught herein, the devices 102, 104, 106, and 108 may concurrently (e.g., simultaneously) utilize a shared medium. For example, the devices 102, 104, 106, and 108 may concurrently transmit signals within the same ultra-wide band frequency band. As depicted in FIG. 1, the device 102 may communicate with the device 104 via two or more concurrently operating channels (e.g., channels 110 and 112). In addition, the device 102 may concurrently communicate with multiple devices (e.g., devices 104 and 106) over different channels (e.g., channels 110 and 114). Furthermore, one set of devices (e.g., devices 102 and 104) may communicate via one channel (e.g., channel 110) while another set of devices (e.g., devices 106 and 108) concurrently communicate via another channel (e.g., channel 116).

Moreover, the channels may be adapted to carry different types of data at different data rates. For example, a channel may carry packet data, streaming data or some other form of data. In addition, a channel may be configured (e.g., via the pulse repetition frequency, a timeslot structure or logical channel definitions) to carry data at different rates. Thus, the channels 110, 112, 114, and 116 in FIG. 1 may be independently defined to carry the specific data required for a given application.

To support efficient channel access, different data types, and different data rates while maintaining relatively low power consumption, in some aspects a channel access scheme may utilize various states of operations. For example, each state may be associated with a certain knowledge of one or more channel parameters and/or to a given duty cycle of a device. To this end, the device 102 may include a state controller 124 that controls the state of the device 102 or of one or more components (e.g., a transmitter and/or a receiver) of the device 102 with respect to a given channel.

Figure 4:
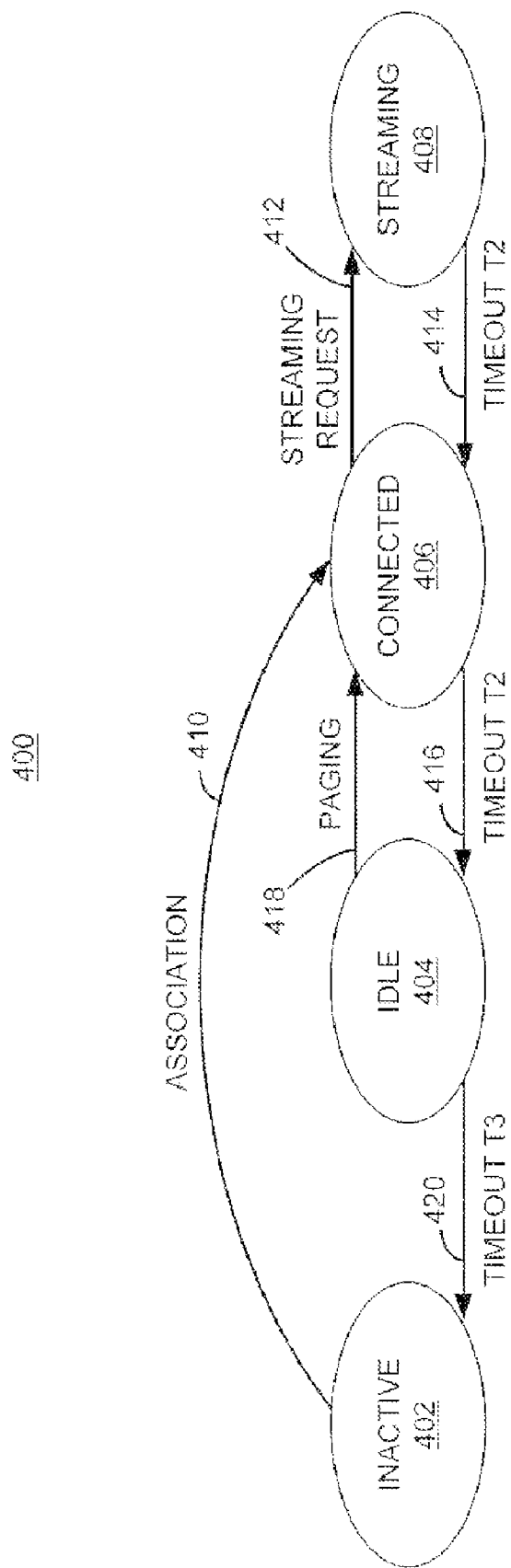
FIG. 4 is a simplified diagram illustrating an example of a state diagram for a channel access scheme.

FIG. 4 illustrates an example of a state diagram 400 representing operations for a channel access scheme that may be employed to transfer data from a transmitter to one or more receivers. In the particular example of FIG. 4, four states (inactive 402, idle 404, connected 406, and streaming 408) are defined. It should be appreciated, however, that in other implementations (or for other channels) a different number and different types of states may be employed.

The inactive state 402 may be defined as a state where a receiver is not aware of the parameters for a given channel, or where a receiver is not listening to the channel. Hence, this state may be a very low duty cycle state. To set up a channel at a receiver, a transmitter distributes the channel parameters during, for example, an association procedure. The corresponding change in state is represented by line 410 in FIG. 4.

In the connected state 406 a receiver may expect data transfer and, consequently, may listen continuously or on a relatively regular basis. In some aspects data transfer from the transmitter to the receiver(s) during the connected state may be in the form of packets. In some aspects, each data frame transmitted by the transmitter may be prefixed with a preamble sequence that facilitates acquisition of the channel by a receiver. The data frames may be acknowledged by a receiver through a separate channel. If no data frame is transferred over the channel for a given period of time, a receiver may move to the idle state 404 to save power. This change in state is represented by line 416 in FIG. 4. Alternatively, a channel may be terminated, resulting in a transition (not shown) to the inactive state 402.

The idle state 404 may be a state of relatively low duty cycle. For example, in this state a receiver may maintain (or otherwise have access to) at least a portion of the parameters relating to the channel (e.g., a device address of the transmitter) that enable the receiver to periodically scan the channel. In general, the time interval between scans may be a trade-off between duty cycling and channel access time budget.

If there is no activity during the idle state 404 for a specified period of time, the idle state 404 may timeout. This, in turn, may cause a transition to the inactive state 402 (line 420). Alternatively, the transition 420 may be initiated upon command.

A transmitter also may send a message (e.g., a paging message) to a receiver that is in the idle state 404 to, for example, reestablish regular communication with the receiver. Thus, upon receiving the message, the receiver may move to the connected state 406 as represented by line 418.

The streaming state may support relatively continuous bit rate applications such as, for example, audio (e.g., radio, music or voice calls), video or some other form of streaming data. This state may be implemented to reduce overhead (e.g., the preamble) otherwise associated with the connected state. Here, since data is being sent on a relatively continual basis, overhead associated with facilitating acquisition of the channel by the receiver may be omitted or substantially reduced. The transmitter may explicitly send a message requesting initiation of a streaming channel, or may piggyback the request when transmitting a data frame (as represented by line 412). Data bits may be transferred continuously over the streaming channel with or without frame structure. Some form of acknowledgement may be provided through a separate channel. In some implementations, a relatively short interruption in the streaming of data may cause the streaming state 408 to time out thereby causing a transition to the connected state 406 (as represented by line 414). Alternatively, the streaming channel may be affirmatively terminated (e.g., via a message in the streaming channel), resulting in a transition to the connected state 406 or some other state (transition not shown). From the above it should be appreciated that switching between the connected state 406 and the streaming state 408 may advantageously be accomplished within the channel, at essentially any time.

A state diagram similar to the state diagram 400 may be employed for each channel defined in a given network. In other words, each channel may independently transition through its respective states based on the current requirements of the application using that channel. Moreover, each channel may independently specify a different level of throughput and duty cycling by, for example, setting the scanning interval in the idle state 404 and/or the pulse repetition frequency of the channel.

Through the use of a PDMA scheme as taught herein, an ultra-wide band system employing low duty cycle signaling may provide low power communications for applications such as a wireless PAN or BAN. In some aspects the corresponding wireless devices may, for example, operate for several years powered only by a relatively small battery (e.g., a watch battery). Such applications may utilize a wide variety of data rates including, for example, relatively low data rates on the order of 1 Kbps. To effectively support such applications, a relatively simple solution with small protocol stack and low overhead as taught herein may be employed. Moreover, the PDMA scheme may provide sufficient flexibility to simultaneously handle other data rates and maintain different levels of duty cycle for these applications.

The teachings herein may be incorporated into various types of systems implemented using various types of devices that support various communication techniques and protocols. For example, in some aspects the system 100 may comprise a transmitted reference system. In this case, a device sends data by transmitting a reference pulse followed by an associated data pulse. A device that receives the pulses may then use the reference pulse as a "noisy matched filter" to detect the data represented by the data pulse. It should be appreciated, however, that the system 100 may employ other pulse-based and/or ultra-wide band signaling techniques.

Figure 5:
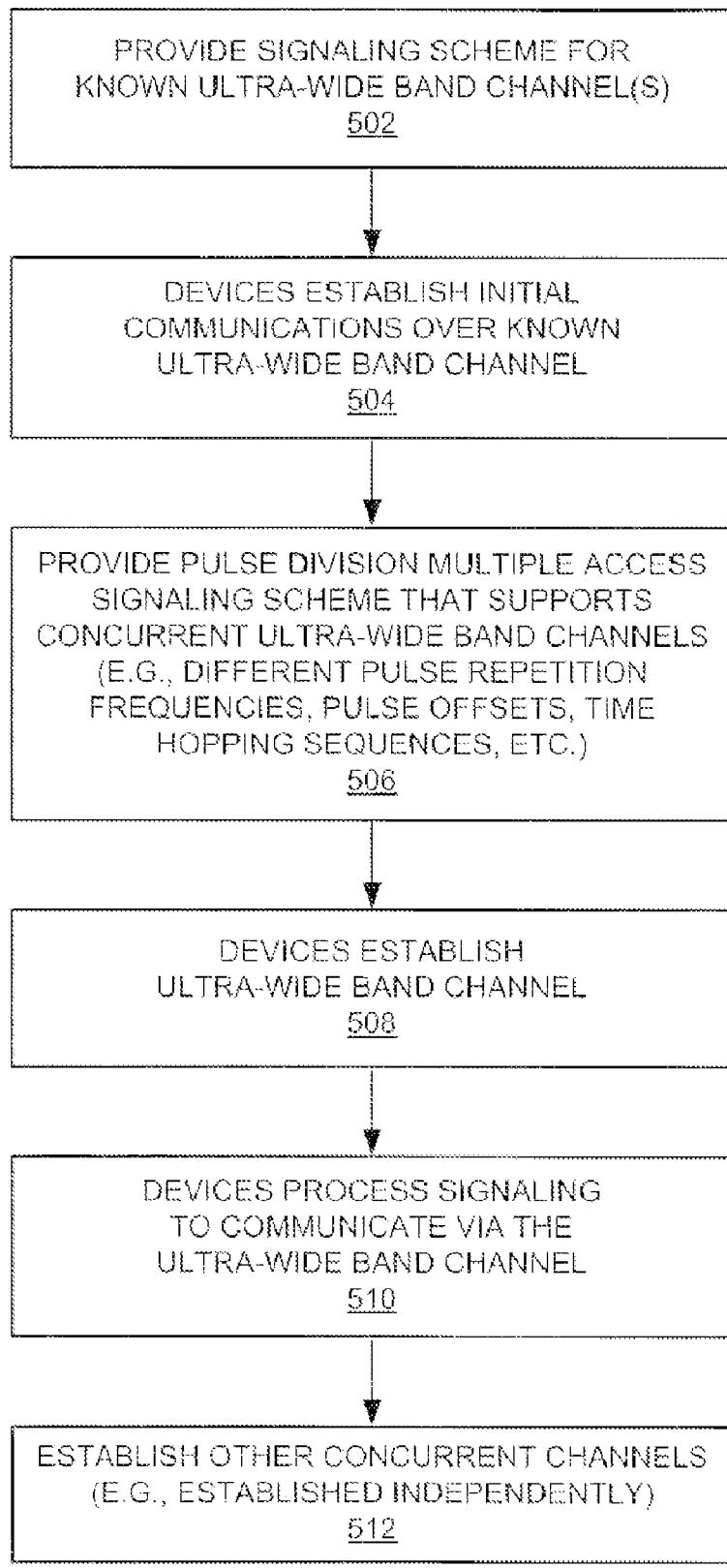
FIG. 5 is a flowchart of several sample aspects of operations that may be performed to establish and communicate via one or more ultra-wide band channels.

Sample operations that may be used to establish a channel and communicate over the channel will now be discussed in conjunction with the flowchart of FIG. 5. For convenience, the operations of FIG. 5 (or any other flowchart herein) may be described as being performed by specific components. It should be appreciated, however, that these operations may be performed in conjunction with and/or by other components.

Devices in a wireless communication system may be configured to establish a channel with another device by initially communicating over a known channel. Here, a wireless device seeking to establish a channel may send preliminary messages (e.g., polling messages) over the known channel. In addition, each device in the system may be configured to periodically scan the known channel for any preliminary messages.

Accordingly, as represented by block 502, the devices may configure their respective transceivers (e.g., by configuring a transmitter in one device and a receiver in another device) to initially use default parameter values for sending signals to and receiving signals from the wireless medium. For example, a device may set the pulse repetition frequency to a value defined for a known channel. In addition, the device may set the preamble sequence to the sequence defined for the known channel. Also, in an implementation that uses time hopping for the known channel, the device may configure its transceiver to use the default sequence (e.g., a default pseudorandom sequence).

As represented by block 504, once preliminary communications are established between two or more devices over the known channel, the devices may perform an association procedure whereby the devices learn the respective capabilities of each device. For example, during an association procedure each device may be assigned a shortened network address (e.g., shorter than a MAC address), the devices may authenticate one another, the devices may negotiate to use a particular security key or keys, and the devices may determine the level of transactions that may be conducted with each device. Based on these capabilities, the devices may negotiate to establish a channel for subsequent communication.

As represented by block 506, the device or devices provide a PDMA signaling scheme that supports concurrent ultra-wide band channels. For example, one or more of the devices may select channel parameters to be used for the ultra-wide band channel. As discussed above, the device(s) may select channel parameters such as, for example, a pulse repetition frequency, a pulse offset, a preamble sequence, a time hopping sequence, a pseudo-random number-based sequence, other suitable parameter(s), or a combination of two or more of these parameters. Moreover, as discussed above, these channel parameters may be selected to avoid or reduce the probability of interference with other concurrently operating channels.

In some cases a device may unilaterally define the parameters to be used for a given channel. For example, the device may randomly select the channel parameters. Alternatively, the device may select channel parameters based on a set of one or more device-related parameters (e.g., a device address, a device location, a time of the day, etc.). In other cases a device may select a channel parameter based on information it has regarding the channel parameters of other channels that are or have been defined in the system (e.g., currently active channels). In any case, the device may send this channel parameter information to each device that will communicate over the channel.

In some cases a device may communicate with one or more other devices to define the channel parameters. For example, a device may select a channel based on information it obtains from other devices regarding the channel parameters of other channels defined in the system. In some cases, in conjunction with the association procedure, two or more devices may negotiate to select the channel parameters.

In some implementations channel parameters such as the pulse repetition period, the preamble sequence, and the time hopping sequence may be exchanged during an association procedure. However, when using relatively narrow pulses, synchronization between a transmitter and a receiver may be lost relatively easily. Accordingly, the offset of pulse may be acquired with every transmission to maintain relatively precise synchronization between the transmitter and the receiver (e.g., to a degree of nanoseconds).

As represented by block 508, once all of the devices have generated or obtained the selected channel parameters, the devices establish the ultra-wide band channel based on these parameters. For example, the devices may set up their respective transceivers to transmit and receive signals in accordance with the selected channel parameters.

As represented by block 510, the devices may then process signaling as necessary to communicate via the established channel. Thus, a transmitter may generate pulses with the appropriate pulse repetition frequency and, if applicable, pulse offset and time hopping sequence. Similarly, a receiver may scan the communication medium for pulses having with that pulse repetition frequency and, if applicable, pulse offset and time hopping sequence.

As represented by block 512, operations similar to those discussed above may be performed to establish and use other channels in the communication system. In this case, however, a device may select different channel parameters at block 506 to establish a channel that may be used concurrently with other channels in the system. Here, the channel parameters (e.g., pulse repetition frequency, time hopping sequence, etc.) for one or more channels may be selected such that concurrent channels may operate with relatively little interference between the signals (e.g., pulses) of the channels.

In a typical implementation, one or more of the components of FIG. 1 may be implemented in the device 102 in a transmitter component, a receiver component or, in combination, in a transceiver component. For example, a transmitter may incorporate functionality relating to components 118, 120, and 122 to define and establish a channel, and generate pulses to transmit data over the channel in accordance with the defined signaling scheme. Similarly, a receiver may incorporate functionality relating to components 118, 120, and 122 to establish a channel with a transmitter, and detect pulses transmitted over the channel in accordance with the corresponding signaling scheme. These and other components and associated operations will be discussed in more detail in conjunction with FIGS. 6, 7, and 8.

Figure 6:
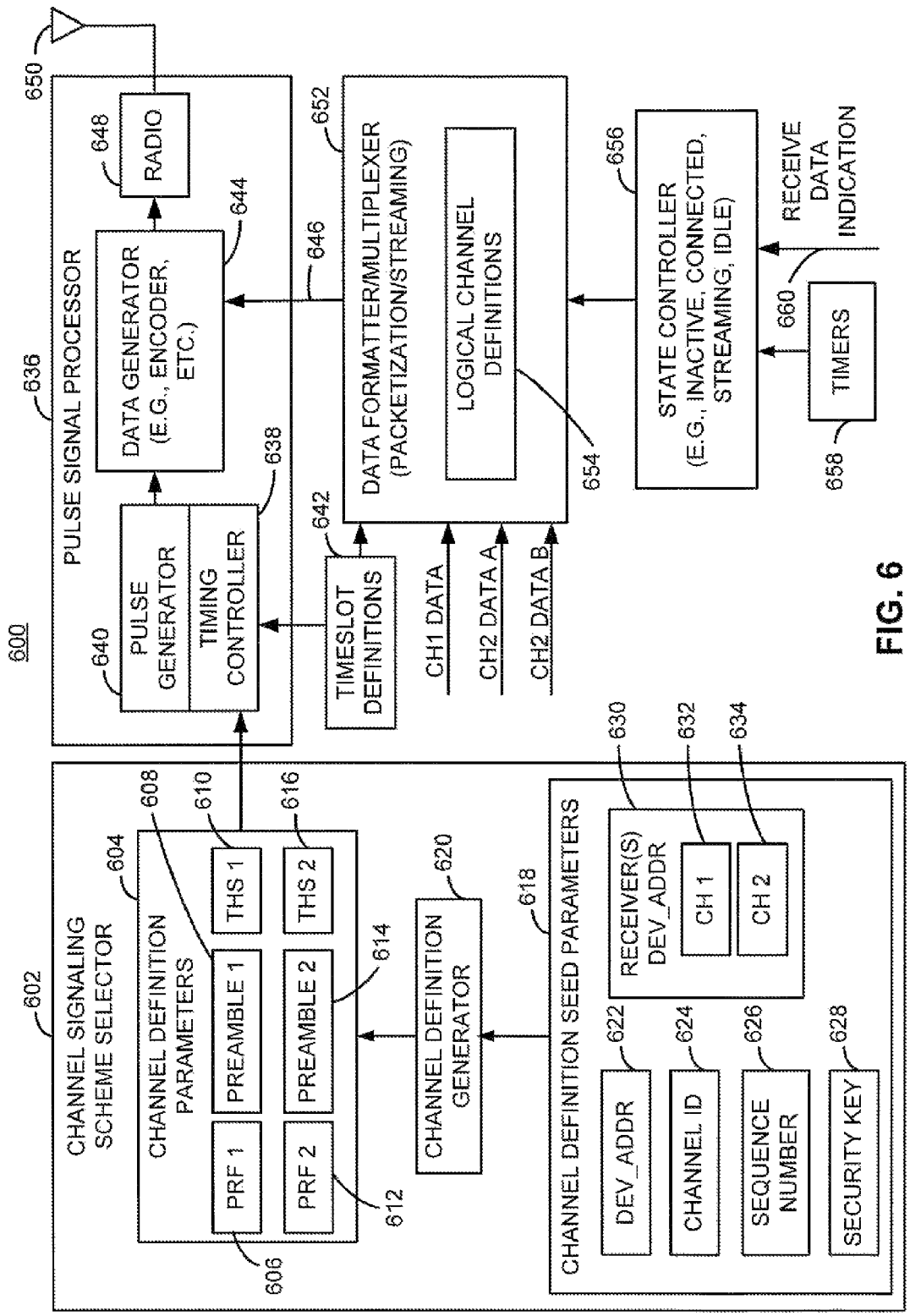
FIG. 6 is a simplified block diagram of several sample aspects of a transmitter employing pulse signaling.

FIG. 6 illustrates several sample components that may be incorporated into a transmitter 600 that supports PDMA. Here, a channel signaling scheme selector 602 (e.g., corresponding to selector 118) provides a signaling scheme for establishing one or more channels. For example, the selector 602 may provide channel definition parameters 604 for a given channel such as a pulse repetition frequency ("PRF"), a preamble sequence, and a time hopping sequence ("THS"). FIG. 6 illustrates an example where two sets of parameters (parameters 606, 608, and 610 and parameters 612, 614, and 616) have been defined for different channels (e.g., a default channel "1" and a new channel "2").

One or more of the channel definition parameters 604 may be generated based on one or more channel definition seed parameters 618. For example, a channel definition generator 620 may select a particular value for a pulse repetition frequency or select a particular sequence for a preamble or for time hopping based on a value of a seed parameter 618 or based on some function of a combination of two or more seed parameters 618. In the specific example depicted in FIG. 6, the channel definition generator 620 may generate one or more of the channel definition parameters 604 based on a device address ("DEV_ADDR") 622, a channel identifier ("ID") 624, a sequence number 626, and a security key 628. In some aspects a channel definition parameter 604 may be generated based on one or more device addresses 630 of one or more receivers that may receive data via the channel. Thus, the transmitter may have access to (e.g., store) receiver device addresses 632 and 634 for different channels. In some aspects the device address 622 comprises a device address associated with the transmitter 600. In this case, the parameters 604 for a given channel may be generated based on the addresses of the transmitter and the receiver(s) using that channel. This technique may increase the likelihood that the parameters for that channel are different than the parameters defined for any neighboring channels.

To further increase the likelihood that the parameters selected for a given channel are unique, a transmitter and a receiver may negotiate (or cooperate in some other manner) to select one or more seed parameters. For example, these components may select a channel identifier, generate a sequence number or generate a security key. In particular, the channel identifier may be used when more than one channel is defined by a given set of devices.

A pulse signal processor component 636 (e.g., corresponding to signal processor 120) uses the channel definition parameters 604 to send data over the channel. For example, a timing controller 638 may control when a pulse generator 640 generates pulses based on the channel definition parameters 604. In addition, in some implementations, the timing of the generated pulses may be based on one or more timeslot definitions 642 representative of a timeslot structure defined for the channel.

In some aspects a data generator component 644 generates pulse signals to be transmitted by combining (e.g., via a modulation scheme) the generated pulses and data 646. For example, in some implementations the phase and/or the position of the pulse signals may be modulated according to the values of the data bits that are to be sent to a receiver. The resulting data pulses are then provided to an appropriate radio component 648 that provides the data pulses to an antenna 650 whereupon the data pulses are transmitted across the communication medium.

As discussed above, the data to be transmitted to a receiver may be formatted in various ways. For example, the transmitter may send data as individual data bits, data packets, streaming data, or in some other suitable form. Accordingly, the transmitter 600 may include a data formatter/multiplexer 652 or some other suitable mechanism for formatting the data to be transmitted. In some implementations, the timing of the transmitted data may be based on one or more timeslot definitions 642 representative of a timeslot structure defined for the channel. In addition, the timing of the transmitted data may be based on one or more logical channel definitions 654 defined for the channel. For example, the data for channel 2 ("CH2") may relate to two distinct data flows (designated CH2 DATA A and CH2 DATA B) that may then be transmitted over channel 2 via two logical channels.

The channel parameter selection operation and the data to be transmitted at any given time may depend on the current state of the channel. For example, during an inactive state the selector 602 may select default channel definition parameters for a known channel. During a connected state the data formatter/multiplexer 652 generate packet data for the channel. During a streaming state the data formatter/multiplexer 652 may generate streaming data for the channel. Accordingly, the transmitter 600 may include a state controller 656 (e.g., corresponding to state controller 124) that may transition between states based on, for example, timing signals from one or more timers 658, receive data indications 660 (e.g., messages received via another channel), or some other suitable criteria.

FIG. 6 also illustrates that a given device may support multiple concurrent channels. For example, based on corresponding sets of channel definition parameters 604, a device may establish orthogonal or pseudo-orthogonal channels (e.g., channels 1 and 2) to enable concurrent transmission of the corresponding data (e.g., CH1 DATA and CH2 DATA) on the channels).

Figure 7:
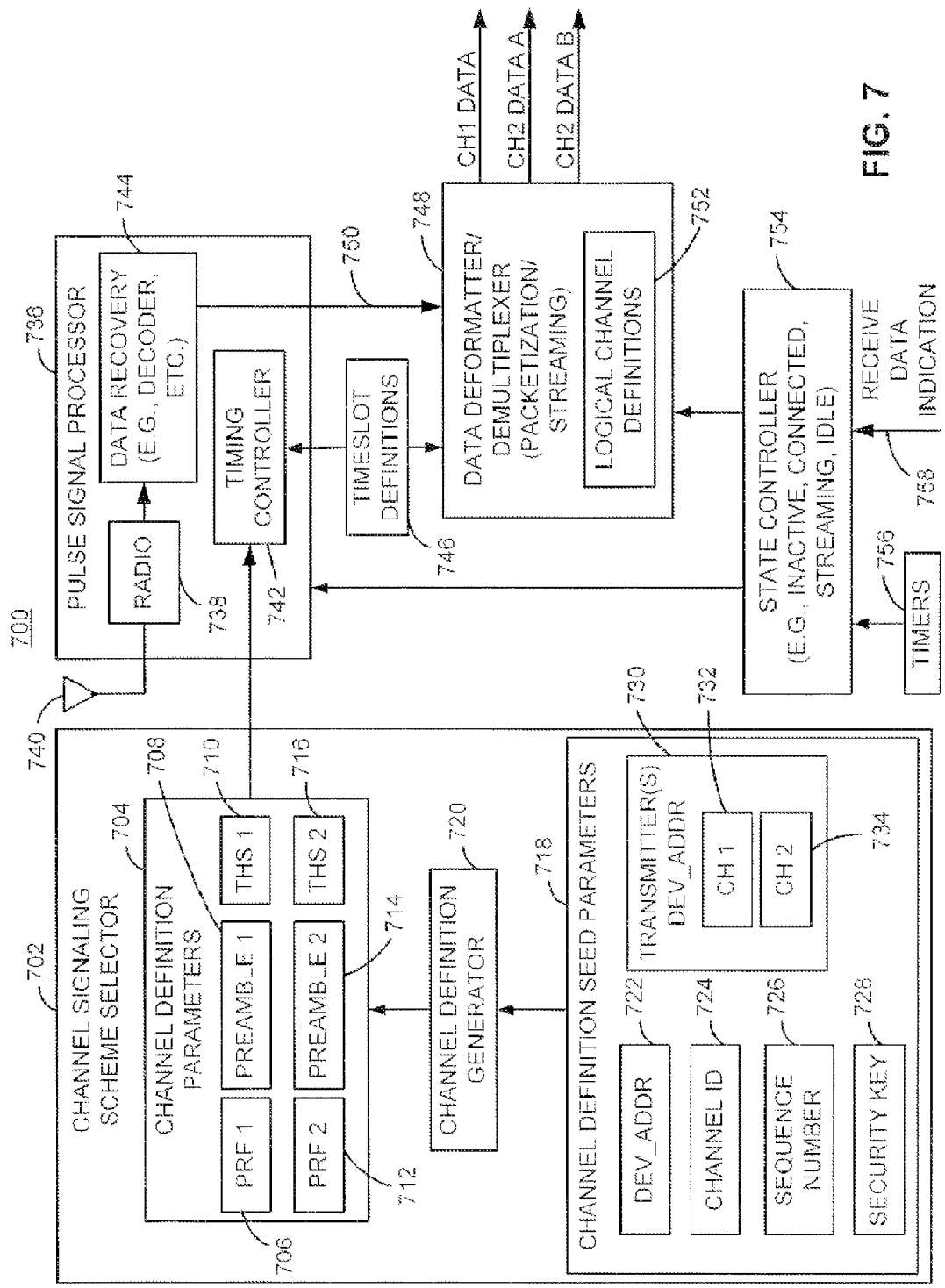
FIG. 7 is a simplified block diagram of several sample aspects of a receiver employing pulse signaling.

FIG. 7 illustrates several sample components that may be incorporated into a receiver 700 that supports PDMA. In a similar manner as discussed above in conjunction with FIG. 6, a channel signaling scheme selector 702 (e.g., corresponding to selector 118) may provide a signaling scheme (e.g., channel definition parameters 704) for establishing one or more channels. Again, the channel definition parameters 704 may include pulse repetition frequency parameters 706, 712, preamble sequences 708, 714, and time hopping sequences 710, 716, defined for one or more channels (e.g., a default channel "1" and a new channel "2"). In some aspects, the receiver 700 may simply have access to (e.g., store) channel definition parameters provided by a transmitter. Alternatively, a receiver may employ components similar to those described above in conjunction with FIG. 6 (e.g., component 720 and parameters 718, 724, 726, and 728) that may be used to derive one or more of the channel definition parameters 704. In this case, the device address 722 may correspond to the address of the receiver 700 while device addresses 730 may correspond to transmitters associated with different channels (addresses 732, 734). As discussed above, the receiver 700 may use one or more of the seed parameters 718 when cooperating with a transmitter to define a channel.

A pulse signal processor component 736 (e.g., corresponding to signal processor 120) uses the channel definition parameters 704 to extract data from signals received from the channel via a radio component 738 and an associated antenna 740. For example, a timing controller 742 may control, based on the channel definition parameters 704, when a data recovery component 744 decodes or otherwise extracts data from the received pulse signals. As discussed above, in some implementations the phase and/or the position of the pulse signals may be modulated according to the values of the data bits that are to be sent to a receiver. Accordingly, the data recovery component 744 may include complementary functionality to recover (e.g., demodulate) data 750 from the data pulses. In addition, in some implementations the timing of the data recovery operations may be based on one or more timeslot definitions 746 representative of a timeslot structure defined for the channel.

As discussed above, the transmitter may send data as individual data bits, packets, streaming data, or in some other form. Accordingly, the receiver 700 may include a data deformatter/demultiplexer 748 or some other suitable mechanism for deformatting the received data 750. Again, the timing of the data may be based on one or more timeslot definitions 746 representative of a timeslot structure defined for the channel. In addition, the timing of the data may be based on one or more logical channel definitions 752 defined for the channel. Thus, the data deformatter/demultiplexer 748 may extract the logical channel data for channel 2 back into the two distinct flows (CH2 DATA A and CH2 DATA B).

Also as discussed above, the channel parameter selection operation and the data received at a given point time may depend on the current state of the channel. Again, during an inactive state the selector 702 may select default channel definition parameters 704 for the known channel. During a connected state the data deformatter/demultiplexer 748 may depacketize the data 750. During a streaming state the data deformatter/demultiplexer 748 may recover a stream of data. The receiver 700 thus includes a state controller 754 (e.g., corresponding to state controller 124) that may transition between states based on, for example, timing signals from one or more timers 756, receive data indications 758 (e.g., messages received via the channel or the presence or absence of traffic on the channel), or some other suitable criteria.

Figure 8:
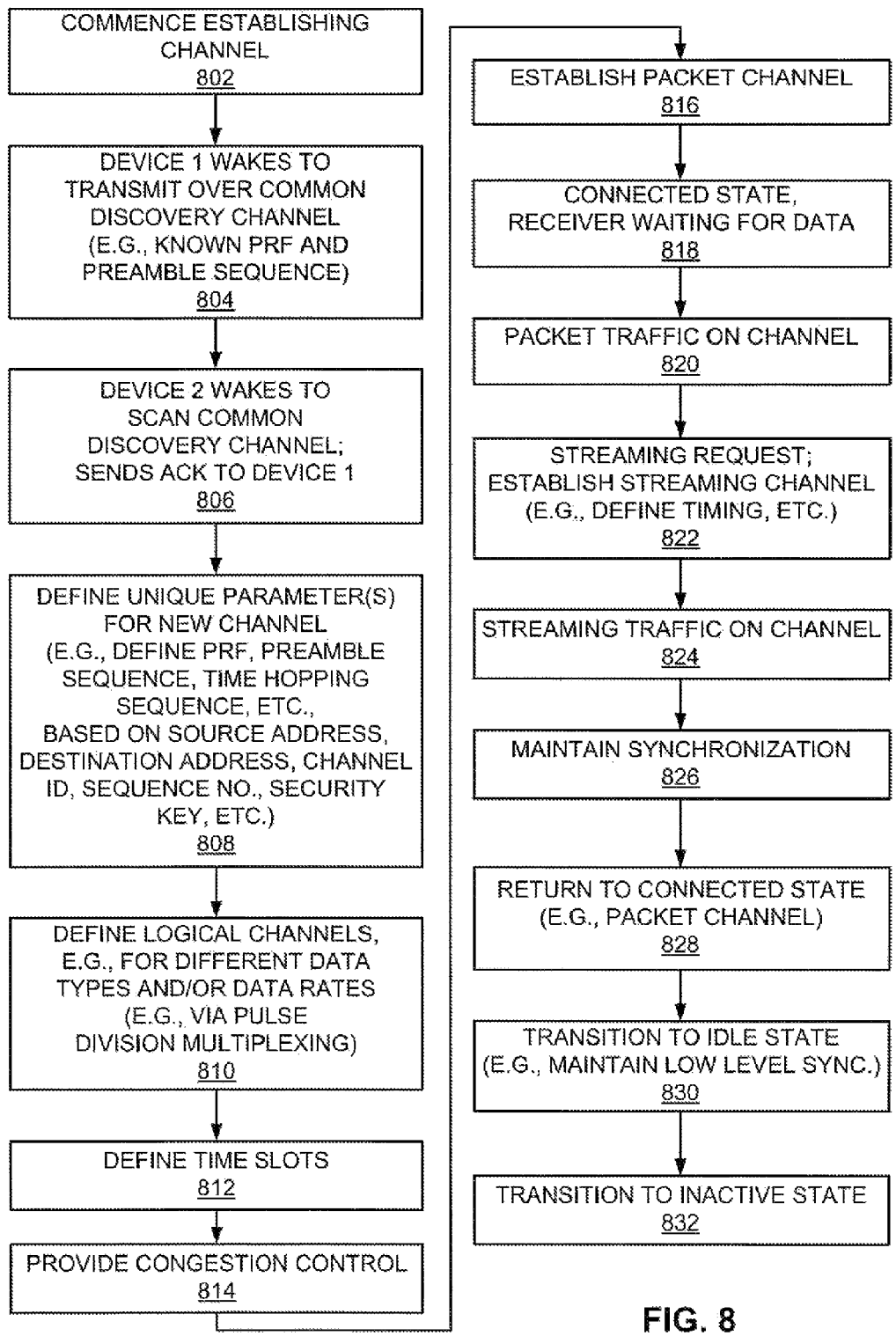
FIG. 8 is a flowchart of several sample aspects of operations that may be performed to establish and communicate via one or more channels using a pulse division multiple access scheme.

With the above description in mind, additional details of operations that may be performed in conjunction with a PDMA scheme will be treated in conjunction with the flowchart of FIG. 8. In particular, these operations relate to setting up a channel and performing various operations associated with the states of the channel.

As represented by block 802, a transmitter (e.g., transmitter 600) in a first device will commence establishment of a channel based on, for example, a request by an application executing on the wireless device that includes the transmitter. Accordingly, as represented by block 804, the transmitter may wake from a power save state (e.g., an inactive state) to send messages (e.g., polling messages) over a known channel (e.g., a common discovery channel) to one or more receivers. Depending upon the requirements of a given application the message may request a response from any receiver that happens to be in the immediate vicinity of the transmitter or from a specific receiver or receivers. The latter case may occur when the transmitter has gained information about the receiver(s) via, for example, a prior association procedure. Also, the transmitter may repeatedly send the messages (e.g., at a known interval) in the event a response is not immediately received from the receiver(s).

As discussed above, the known channel may be defined by known channel parameters. In a typical implementation, these parameters may include a known pulse repetition frequency and a known preamble. In other implementations, other parameters such as a time hopping sequence or code spreading sequence may be defined for the known channel. In some implementations more than one known channel may be defined. Also, in some implementations a known channel may be defined for a given sub-network (e.g., a group of wireless device that are expected to be in communication at some point in time).

As represented by block 806, a receiver in a second device may be configured to regularly (e.g., periodically) wake from a power save state to scan the known channel. The receiver may then send an acknowledgement ("ACK") to the transmitter via the same channel or a different channel.

As represented by block 808, the transmitter and, optionally, the receiver may define the parameters for a new channel. As discussed above, this may be accomplished through the operations of the selector 602 and/or the selector 702. Moreover, the channel parameters may be based on one or more seed parameters such as a device address, etc.

As represented by blocks 810, 812, and 814, the transmitter and, optionally, the receiver may define additional attributes of the channel. Specifically, one or more logical channels maybe defined for the channel (block 810), a timeslot structure may be defined for the channel (block 812), and some form of congestion control may be implemented in an attempt to reduce interference between neighboring channels (block 814). These definitions are typically made when the channel is established. However, in some cases, an attribute (e.g., a logical channel) may be defined at some later point in time.

As represented by block 816, in some implementations the transmitter and the receiver may initially set up the channel for packet traffic. For example, the transmitter may sent payload data encapsulated in a packet (e.g., with an appropriate header and error control information) that is preceded by a preamble associated with that channel. Advantageously, this set up procedure may be performed when a channel is initially established or at some later point in time. Moreover, as discussed herein, a channel may be reconfigured to support other types of data traffic.

As represented by block 818, the channel may at this point be in the connected state 406 discussed above. Thus, the receiver may continually scan the channel for packets sent by the transmitter (block 820).

As represented by block 822, at some point in time it may be desirable to send streaming data over the channel. Such a reconfiguration may be initiated, for example, by the transmitter sending a streaming request to the receiver via a packet on the packet channel. In response to this request, the transmitter and the receiver may cooperate to establish a streaming channel over the channel. For example, these components may define the timing of the streaming channel, the types of data to be transmitted over the channel, any synchronization that may be employed, timeout intervals, timeslot times, timeslot size, or any other suitable characteristic of the streaming channel.

In some aspects, the streaming channel may be concurrently established with the packet channel. For example, the packet channel may not be completely torn down at block 822. Rather, as discussed herein, the transmitter and the receiver may seamlessly transition between the packet channel and the streaming channel whenever necessary.

Once the streaming channel is established the transmitter may send streaming data to the receiver (block 824). At this point the channel may be in the streaming state 408 discussed above. During this state the transmitter and the receiver may takes steps to maintain synchronization with respect to the streaming channel (block 826). For example, the transmitter may send synchronization information (e.g., timing information) to the receiver at regular (e.g., periodic) intervals.

At some point in time the channel may be reconfigured back to the packet channel (block 828). This transition may be initiated, for example, in response to an explicit request sent over the streaming channel or, automatically, due to a lack of streaming data for a specified period of time (e.g., a timeout after several milliseconds of inactivity). Thus, at this point the channel may return to the connected state 406.

At some point in time the channel may revert to the idle state 404 (block 830). This may occur, for example, in response to an explicit request sent over the packet channel or, automatically, due to a lack of packet data for a specified period of time (e.g., a timeout after several seconds of inactivity). In this state, the transmitter may maintain relatively low level synchronization. For example, the transmitter may wake occasionally to send synchronization information over the channel. Similarly, the receiver may wake occasionally to scan the channel for the synchronization information, polling messages or other messages.

As represented by block 832, at some point in time the channel may revert to the inactive state 402. Again, this may occur in response to an explicit request or, automatically, due to a lack of data for a specified period of time (e.g., a timeout after a day, week, etc., of inactivity). In this lower duty cycle state, the receiver may, for example wake occasionally to scan the channel for polling messages or other types of messages.

The teachings herein may be incorporated into a variety of devices. For example, one or more aspects taught herein may be incorporated into a phone (e.g., a cellular phone), a personal data assistant ("PDA"), an entertainment device (e.g., a music or video device), a headset, a microphone, a biometric sensor (e.g., a heart rate monitor, a pedometer, an EKG device, etc.), a user I/O device (e.g., a watch, a remote control, a light switch, etc.) or any other suitable device. Moreover, these devices may have different power and data requirements. Advantageously, the teachings herein may be adapted for use in low power applications (e.g., through the use of a pulse-based signaling scheme and low duty cycle modes) and may support a variety of data rates including relatively high data rates (e.g., through the use of high-bandwidth pulses).

Figure 9:
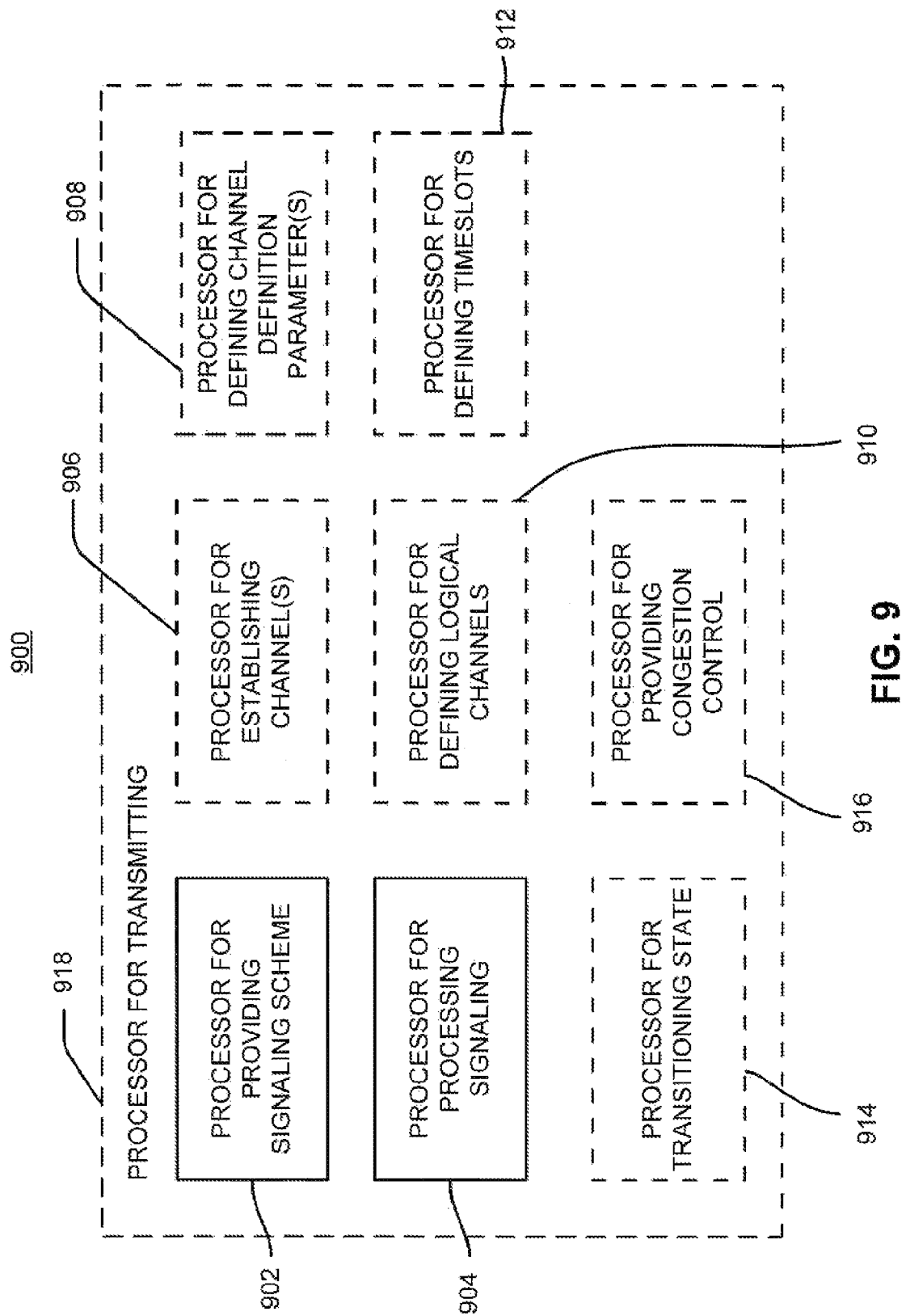
FIG. 9 is a simplified block diagram of several sample aspects of an apparatus adapted to support concurrent ultra-wide band channels.
Figure 10:
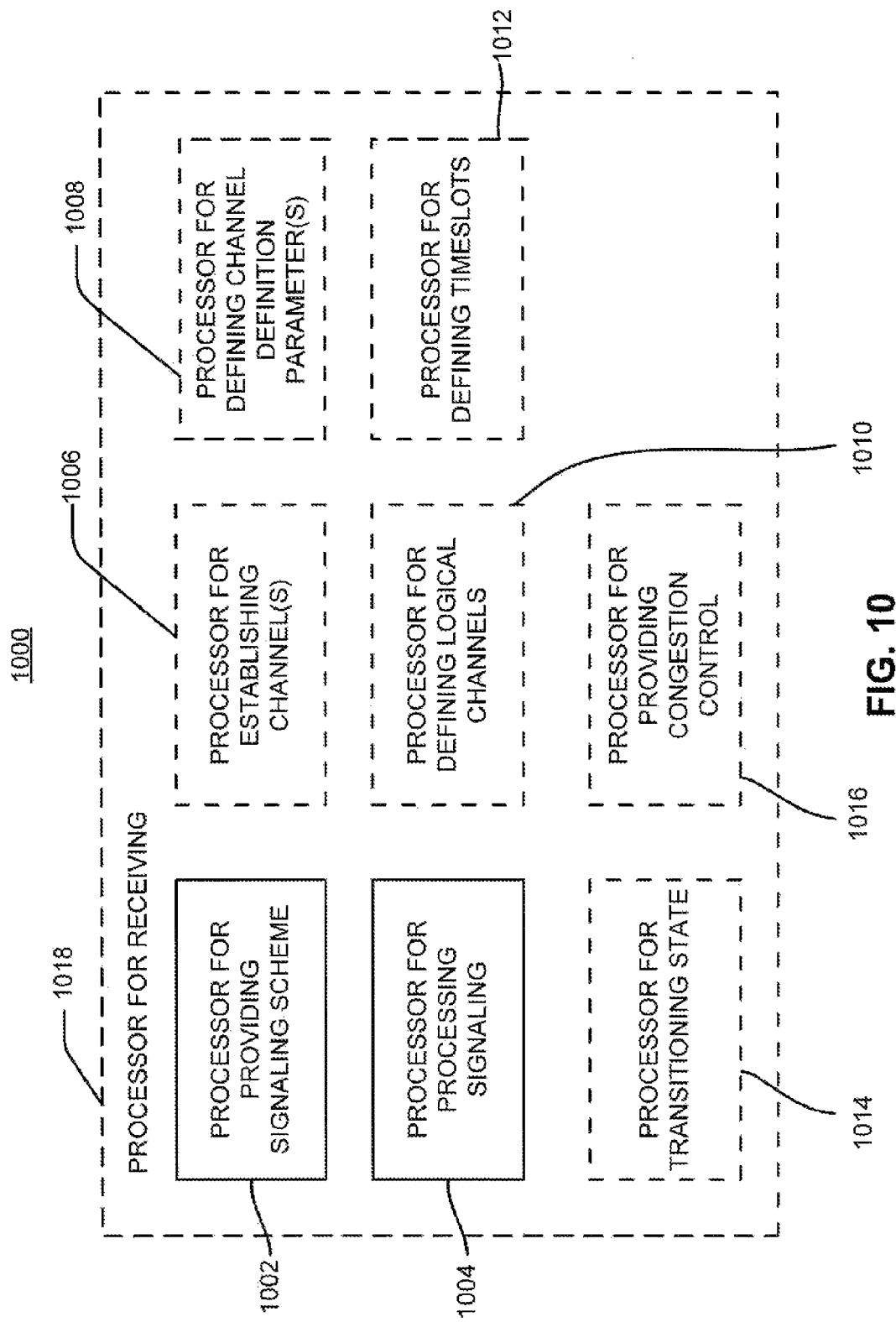
FIG. 10 is a simplified block diagram of several sample aspects of an apparatus adapted to support concurrent ultra-wide band channels.

The components described herein may be implemented in a variety of ways. For example, referring to FIG. 9, an apparatus 900 includes components 902, 904, 906, 908, 910, 912, 914, and 916, that may correspond to, for example, components 118, 120, 122, 118, 122, 122, 124, and 126, respectively. In some aspects these components may be incorporated in a component 918 that may correspond to, for example, component 600 in FIG. 6. In FIG. 10 an apparatus 1000 includes similar components 1002, 1004, 1006, 1008, 1010, 1012, 1014, and 1016. In some aspects these components may be incorporated in a component 1018 that may correspond to, for example, component 700 in FIG. 7. FIGS. 9 and 10 illustrate that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In addition, the components and functions represented by FIGS. 9 and 10, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for providing signaling scheme may comprise a selector, means for processing signaling may comprise a signal processor, means for establishing channels may comprise a channel establisher, means for defining channel parameters may comprise a channel definer (e.g., implemented in conjunction with a channel establisher), means for defining logical channels may comprise a channel definer (e.g., implemented in conjunction with a channel establisher), means for defining timeslots may comprise a timeslot definer (e.g., implemented in conjunction with a channel establisher), means for transitioning state may comprise a state controller, means for providing congestion control may comprise a congestion controller. One or more of such means also may be implemented in accordance with one or more of the processor components of FIGS. 9 and 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other techniques), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, any suitable computer-program product may comprise a computer-readable medium comprising codes relating to one or more of the aspects of the disclosure. For example, the computer-program product can comprise a CD-ROM having codes or instructions thereon and materials for packaging such CD-ROM for sale to customers.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An ultra-wide band communication method, comprising:
   providing, by an apparatus, a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
   processing, by the apparatus, signaling, in accordance with the signaling scheme, to facilitate communication via a defined ultra-wide band channel; and
   establishing concurrent ultra-wide band channels, by the apparatus, using pulse division multiple access based on the distinct time hopping sequences wherein each channel is established independently by the apparatus, without coordinating with respect to an access scheme for any other ultra-wide band channel operating by the apparatus.

2. The method of claim 1, wherein establishing the concurrent ultra-wide band channels further comprises establishing, by the apparatus, pseudo-orthogonal channels wherein substantially all pulses for a given channel are transmitted at different times than pulses for any other one of the channels.

3. The method of claim 1, wherein the concurrent channels carry data at different data rates.

4. The method of claim 1, further comprising defining, by the apparatus, at least one unique channel definition parameter for each ultra-wide band channel.

5. The method of claim 4, wherein the at least one channel definition parameter comprises at least one of the group consisting of: a pulse repetition frequency, a preamble sequence, and at least one of the time hopping sequences.

6. The method of claim 1, further comprising selecting, by the apparatus, a time hopping sequence associated with the defined ultra-wide band channel based on at least one seed parameter known by the apparatus.

7. The method of claim 6, wherein the at least one seed parameter comprises at least one of the group consisting of: a transmitter address, a receiver address, a channel identifier, a sequence number, and a security key.

8. The method of claim 1, further comprising defining, by the apparatus, a plurality of multiplexed logical channels for the defined ultra-wide band channel.

9. The method of claim 8, wherein different logical channels support different data rates, different data types, or different data rates and different data types.

10. The method of claim 1, further comprising:
concurrently establishing, by the apparatus, a packet channel and a streaming channel for the defined ultra-wide band channel, wherein the streaming channel uses fewer overhead bits to transport data than the packet channel; and
processing, by the apparatus, packet data or streaming data associated with the defined ultra-wide band channel.

11. The method of claim 1, further comprising:
establishing, by the apparatus, a packet channel for the defined ultra-wide band channel; and
reconfiguring, by the apparatus, the defined ultra-wide band channel to establish a streaming channel instead of the packet channel.

12. The method of claim 1, further comprising defining, by the apparatus, timeslots for the defined ultra-wide band channel.

13. The method of claim 1, further comprising defining, by the apparatus and by pulse division multiplexing, a plurality of logical channels in the defined ultra-wide band channel.

14. The method of claim 1, further comprising transitioning, by the apparatus, from an inactive state, in which a receiver of the apparatus does not listen to the defined ultra-wide band channel, to a connected state to establish packet communications.

15. The method of claim 14, further comprising transitioning, by the apparatus, from the connected state to a streaming state to establish streaming communications.

16. The method of claim 15, further comprising transitioning, by the apparatus and in response to a timeout, from the streaming state to the connected state to reestablish the packet communications.

17. The method of claim 1, further comprising providing, by the apparatus, congestion control in accordance with a request-to-synchronize (RTS) and confirmation-to-synchronize (CTS) scheme.

18. The method of claim 1, further comprising transmitting, by the apparatus, the signaling via the defined ultra-wide band channel.

19. The method of claim 1, further comprising receiving, by the apparatus, the signaling via the defined ultra-wide band channel.

20. The method of claim 1 wherein each of the time hopping sequences is orthogonal relative to the other time hopping sequences.

21. The method of claim 1 wherein each of the time hopping sequences is substantially non-coincident relative to the other time hopping sequences.

22. The method of claim 1, further comprising selecting, by the apparatus, a time hopping sequence associated with the defined ultra-wide band channel based on a location of the apparatus.

23. The method of claim 1, further comprising selecting, by the apparatus, a time hopping sequence associated with the defined ultra-wide band channel based on the time of day.

24. An apparatus for providing ultra-wide band communication, comprising:
a signaling scheme selector configured to provide a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
a hardware signal processor configured to process signaling, in accordance with the signaling scheme, to facilitate communication via a defined ultra-wide band channel; and
a channel establisher configured to establish concurrent ultra-wide band channels using pulse division multiple access based on the distinct time hopping sequences wherein the channel establisher is further configured to establish each channel independently, without coordinating with respect to an access scheme for any other channel.

25. The apparatus of claim 24, wherein the channel establisher is further configured to establish pseudo-orthogonal channels wherein substantially all pulses for a given channel are transmitted at different times than pulses for any other one of the channels.

26. The apparatus of claim 24, wherein the concurrent channels carry data at different data rates, carry different data types, or carry data at different data rates and carry different data types.

27. The apparatus of claim 24, wherein the signaling scheme selector is further configured to define at least one unique channel definition parameter for each ultra-wide band channel.

28. The apparatus of claim 27, wherein the at least one channel definition parameter comprises at least one of the group consisting of: a pulse repetition frequency, a preamble sequence, and at least one of the time hopping sequences.

29. The apparatus of claim 24, wherein the signaling scheme selector is further configured to select a time hopping sequence associated with the defined ultra-wide band channel based on at least one seed parameter known by the apparatus.

30. The apparatus of claim 29, wherein the at least one seed parameter comprises at least one of the group consisting of: a transmitter address, a receiver address, a channel identifier, a sequence number, and a security key.

31. The apparatus of claim 24, further comprising a channel establisher configured to define a plurality of multiplexed logical channels for the defined ultra-wide band channel.

32. The apparatus of claim 31, wherein different logical channels support different data rates, different data types, or different data rates and different data types.

33. The apparatus of claim 24, further comprising a channel establisher configured to concurrently establishing a packet channel and a streaming channel for the defined ultra-wide band channel, wherein the streaming channel uses fewer overhead bits to transport data than the packet channel, and wherein the signal processor is further configured to process packet data or streaming data associated with the defined ultra-wide band channel.

34. The apparatus of claim 24, further comprising a channel establisher configured to:
establish a packet channel for the defined ultra-wide band channel; and
reconfigure the defined ultra-wide band channel to establish a streaming channel instead of the packet channel.

35. The apparatus of claim 24, further comprising a channel establisher configured to define timeslots for the defined ultra-wide band channel.

36. The apparatus of claim 24, further comprising a channel establisher configured to define, by pulse division multiplexing, a plurality of logical channels in the defined ultra-wide band channel.

37. The apparatus of claim 24, further comprising a state controller configured to transition from an inactive state, in which a receiver of the apparatus does not listen to the defined ultra-wide band channel, to a connected state to establish packet communications.

38. The apparatus of claim 37, wherein the state controller is further configured to transition from the connected state to a streaming state to establish streaming communications.

39. The apparatus of claim 38, wherein the state controller is further configured to transition, in response to a timeout, from the streaming state to the connected state to reestablish the packet communications.

40. The apparatus of claim 24, further comprising a congestion controller configured to provide congestion control in accordance with a request-to-synchronize (RTS) and confirmation-to-synchronize (CTS) scheme.

41. The apparatus of claim 24, wherein the apparatus is implemented in a transmitter configured to transmit the signaling via the defined ultra-wide band channel.

42. The apparatus of claim 24, wherein the apparatus is implemented in a receiver configured to receive the signaling via the defined ultra-wide band channel.

43. The apparatus of claim 24, wherein the defined ultra-wide band channel has a fractional bandwidth on the order of 20% or more, has a bandwidth on the order of 500 MHz or more, or has a fractional bandwidth on the order of 20% or more and has a bandwidth on the order of 500 MHz or more.

44. An apparatus for providing ultra-wide band communication, comprising:
means for providing a signaling scheme that supports concurrent ultra-wide band channels over a wireless medium using pulse division multiple access, based on distinct time hopping sequences defined for the channels, wherein each of the time hopping sequences is pseudo-orthogonal relative to the other time hopping sequences;
means for processing signaling, in accordance with the signaling scheme, to facilitate communication via a defined ultra-wide band channel; and
means for establishing concurrent ultra-wide band channels using pulse division multiple access based on the distinct time hopping sequences wherein the means for establishing further establishes each channel independently, without coordinating with respect to an access scheme for any other channel.

45. The apparatus of claim 44, wherein the means for establishing further establishes pseudo-orthogonal channels wherein substantially all pulses for a given channel are transmitted at different times than pulses for any other one of the channels.

46. The apparatus of claim 44, wherein the concurrent channels carry data at different data rates, carry different data types, or carry data at different data rates and carry different data types.

47. The apparatus of claim 44, further comprising means for defining at least one unique channel definition parameter for each ultra-wide band channel.

48. The apparatus of claim 47, wherein the at least one channel definition parameter comprises at least one of the group consisting of: a pulse repetition frequency, a preamble sequence, and at least one of the time hopping sequences.

49. The apparatus of claim 44, further comprising means for selecting a time hopping sequence associated with the defined ultra-wide band channel based on at least one seed parameter known by the apparatus.

50. The apparatus of claim 49, wherein the at least one seed parameter comprises at least one of the group consisting of: a transmitter address, a receiver address, a channel identifier, a sequence number, and a security key.

51. The apparatus of claim 44, further comprising means for defining a plurality of multiplexed logical channels for the defined ultra-wide band channel.

52. The apparatus of claim 51, wherein different logical channels support different data rates, different data types, or different data rates and different data types.

53. The apparatus of claim 44, further comprising means for concurrently establishing a packet channel and a streaming channel for the defined ultra-wide band channel, wherein the streaming channel uses fewer overhead bits to transport data than the packet channel, wherein the means for processing further processes packet data or streaming data associated with the defined ultra-wide band channel.

54. The apparatus of claim 44, further comprising means for establishing a packet channel for the defined ultra-wide band channel, and reconfiguring the defined ultra-wide band channel to establish a streaming channel instead of the packet channel.

55. The apparatus of claim 44, further comprising means for defining timeslots for the defined ultra-wide band channel.

56. The apparatus of claim 44, further comprising means for defining, by pulse division multiplexing, a plurality of logical channels in the defined ultra-wide band channel.

57. The apparatus of claim 44, further comprising means for transitioning from an inactive state, in which a receiver of the apparatus does not listen to the defined ultra-wide band channel, to a connected state to establish packet communications.

58. The apparatus of claim 57, further comprising means for transitioning from the connected state to a streaming state to establish streaming communications.

59. The apparatus of claim 58, further comprising means for transitioning, in response to a timeout, from the streaming state to the connected state to reestablish the packet communications.

60. The apparatus of claim 44, further comprising means for providing congestion control in accordance with a request-to-synchronize (RTS) and confirmation-to-synchronize (CTS) scheme.

61. The apparatus of claim 44, further comprising means for transmitting the signaling via the defined ultra-wide band channel.

62. The apparatus of claim 44, further comprising means for receiving the signaling via the defined ultra-wide band channel.

63. A computer-program product for providing ultra-wide band communication comprising:

a non-transitory computer-readable medium comprising codes for causing a computer to:
  provide a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
  process signaling, in accordance with the signaling scheme, to facilitate communication via a defined ultra-wide band channel; and
  establish concurrent ultra-wide band channels using pulse division multiple access based on the distinct time hopping sequences wherein each channel is established independently, without coordinating with respect to an access scheme for any other channel.

64. A headset, comprising:
a transducer adapted to process audio data;
a signaling scheme selector configured to provide a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
a signal processor configured to process signaling comprising the audio data, in accordance with the signaling scheme, to facilitate communication via a defined ultra-wide band channel; and
a channel establisher configured to establish concurrent ultra-wide band channels using pulse division multiple access based on the distinct time hopping sequences wherein the channel establisher is further configured to establish each channel independently, without coordinating with respect to an access scheme for any other channel.

65. A watch, comprising:
a signaling scheme selector configured to provide a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
a signal processor configured to process signaling comprising data, in accordance with the signaling scheme, to facilitate communication via a defined ultra-wide band channel;
a user interface adapted to generate an indication based on the signaling; and
a channel establisher configured to establish concurrent ultra-wide band channels using pulse division multiple access based on the distinct time hopping sequences wherein the channel establisher is further configured to establish each channel independently, without coordinating with respect to an access scheme for any other channel.

66. A sensor, comprising:
a sensor adapted to generate data;
a signaling scheme selector configured to provide a signaling scheme that supports concurrent ultra-wide band channels over a wireless medium using pulse division multiple access based on distinct time hopping sequences defined for the channels, wherein each of the time hopping sequences is pseudo-orthogonal relative to the other time hopping sequences;
a signal processor configured to process signaling comprising the data, in accordance with the signaling scheme, to facilitate communication via a defined ultra-wide band channel; and
a channel establisher configured to establish concurrent ultra-wide band channels using pulse division multiple access based on the distinct time hopping sequences wherein the channel establisher is further configured to establish each channel independently, without coordinating with respect to an access scheme for any other channel.

* * * * *